United States Patent [19]
Shaw et al.

[11] Patent Number: 5,532,773
[45] Date of Patent: Jul. 2, 1996

[54] METHOD AND APPARATUS FOR INDEXING AND RETRIEVAL OF A CONTINUOUS VISUAL IMAGE MEDIUM

[75] Inventors: Ronald Shaw, 140 The Village, No. 402, Redondo Beach, Calif. 90277; John Brooks, 1834 Bentley Ave., Los Angeles, Calif. 90025; Frank Flemming, 12540 Burbank Blvd., No. 303, North Hollywood, Calif. 91607

[73] Assignee: Ronald Shaw, Redondo Beach, Calif.

[21] Appl. No.: 144,733

[22] Filed: Oct. 27, 1993

[51] Int. Cl.[6] .......................... G03D 17/24; G03B 21/32
[52] U.S. Cl. .......................... 353/26 A; 353/121; 352/92; 352/236
[58] Field of Search .................. 353/26 A, 26 R, 353/25, DIG. 2, 121, 122; 369/47, 48, 50; 354/106, 107, 109; 352/92, 236; 347/224, 229, 249

[56] References Cited

U.S. PATENT DOCUMENTS

| | | | |
|---|---|---|---|
| 3,708,677 | 1/1973 | Volk et al. | 353/26 A |
| 3,757,091 | 9/1973 | Baker | 353/26 A |
| 3,858,967 | 1/1975 | O'Donnell | 354/109 |
| 4,174,891 | 11/1979 | Flint et al. | 353/26 A |
| 4,504,130 | 3/1985 | Bell et al. | 354/109 |
| 4,938,585 | 7/1990 | Weiffeuback et al. | 352/92 |
| 4,962,432 | 10/1990 | Ohtsuka et al. | 346/108 |
| 4,972,068 | 11/1990 | Ohtani et al. | 353/26 A |
| 4,981,351 | 1/1991 | Endo | 353/27 A |
| 4,987,434 | 1/1991 | Soshi et al. | 354/106 |
| 5,038,379 | 8/1991 | Sano . | |
| 5,122,645 | 6/1992 | Saeki et al. | 353/26 A |
| 5,164,574 | 11/1992 | Ujiie et al. | 353/26 A |
| 5,164,865 | 11/1992 | Shaw | 353/26 R |
| 5,212,367 | 5/1993 | Takenaka | 353/26 A |

OTHER PUBLICATIONS

L. Thorpe et al. "New Advances in CD Imaging", May/1988, 378, SMPTE Journal.
Wiles et al., "Digital Optical Sound..." Nov./1990, SMPTE Journal, 899.
James Kutzner et al., "Measurement and Testing of CCD Sensors and Cameras", SIMPE Journal, 325, May/1992.

*Primary Examiner*—William C. Dowling
*Attorney, Agent, or Firm*—Thomas I. Rozsa; Tony D. Chen

[57] ABSTRACT

The present invention is a method of applying variable, momentous production information to each frame of a continuous visual image medium at the instant of use or after use, without interfering with the formation or display of the normal visual image on the same frame. The recorded production information become absolute reference points on the continuous visual image medium, enabling fast and accurate identification and retrieval at a later date. The method addresses various needs in an ever increasing market ranging from major motion pictures to home videos. The present invention is also a system of recording or retrieving the production information on each frame of a continuous visual image medium. The system includes the actual hardware for the writing and reading of the index code, and the software necessary to decode the code and translate it into useful and user readable information. The system offers producers, directors and editors the freedom to quickly identify and retrieve footage for consideration, while maintaining an accurate asset control on a frame by frame basis. The system also maximizes the usefulness and potential re-use of visual materials.

12 Claims, 6 Drawing Sheets

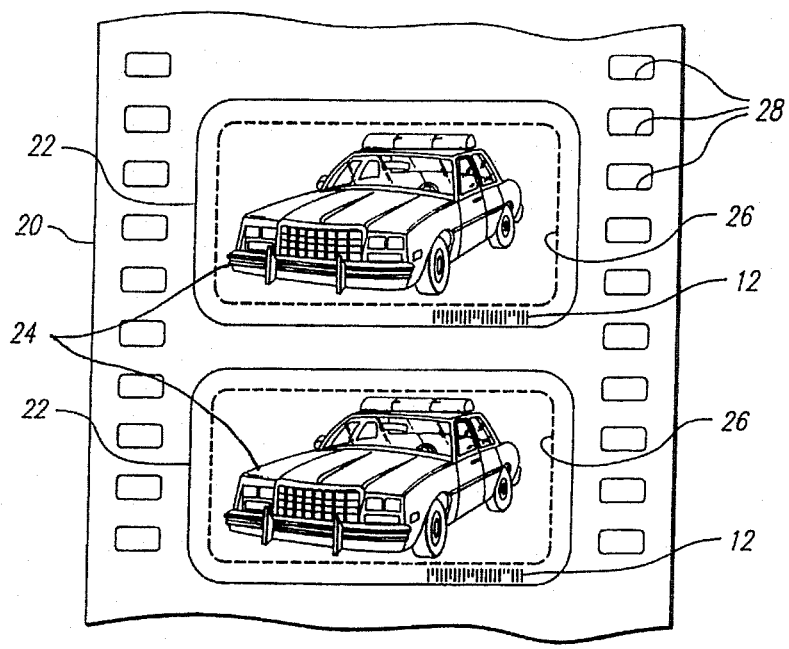
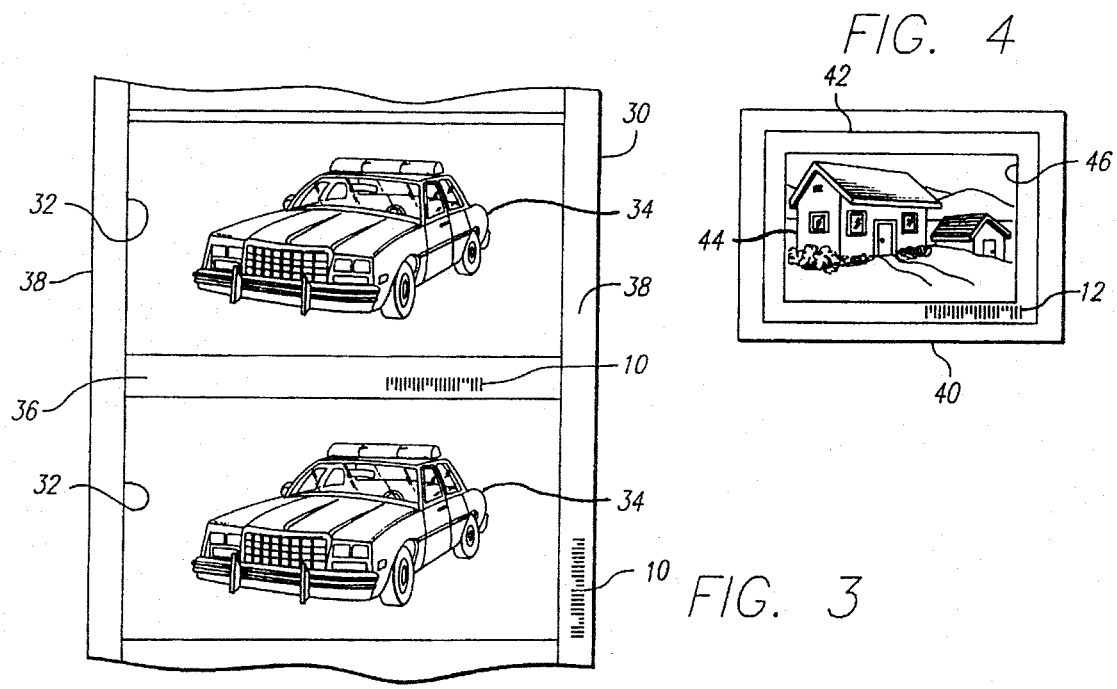

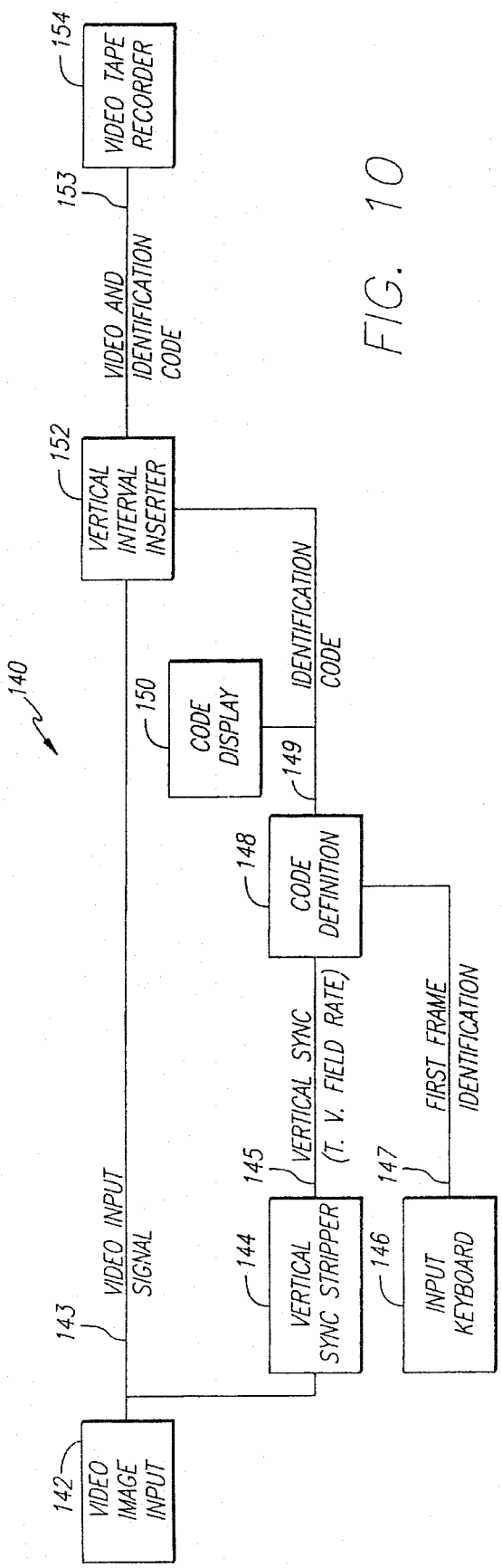
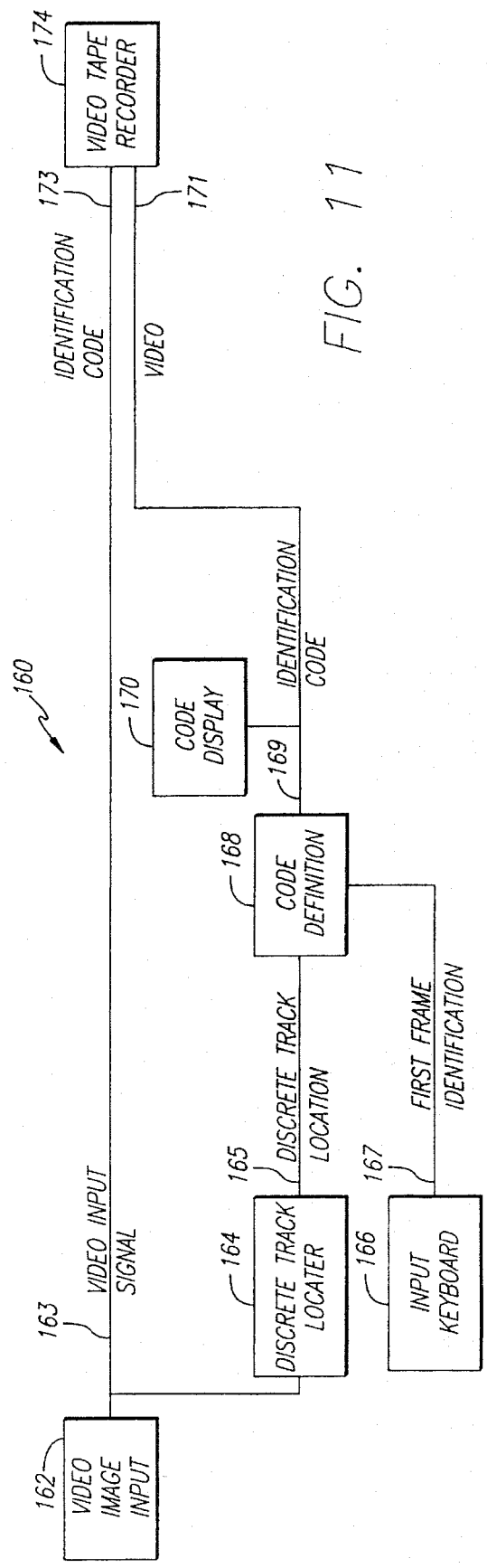

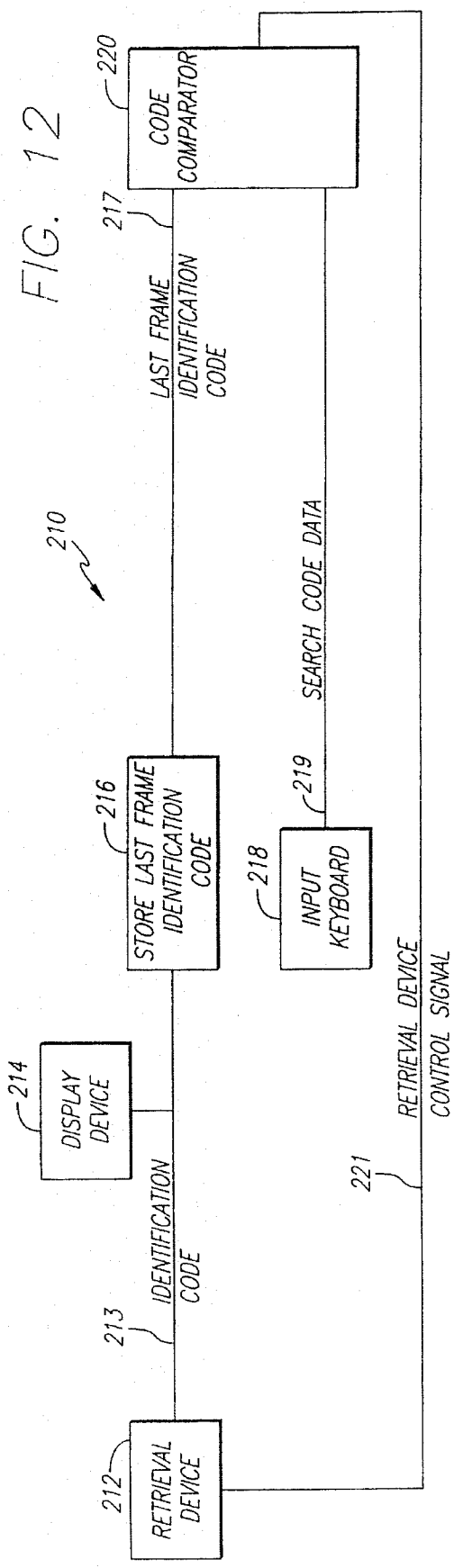
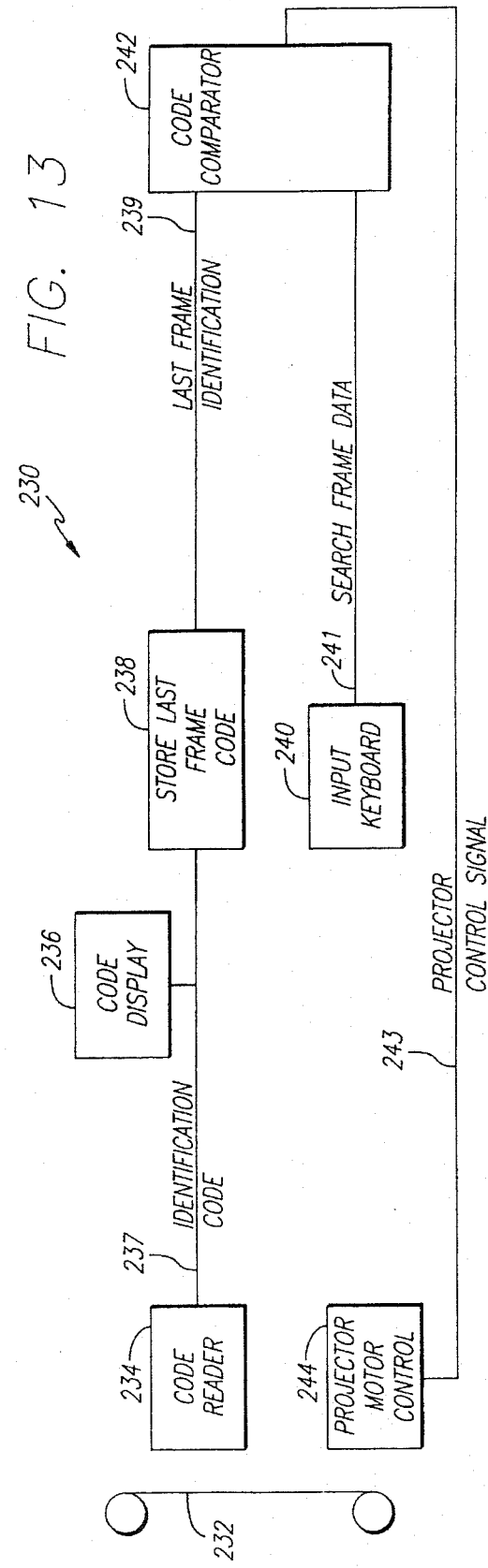

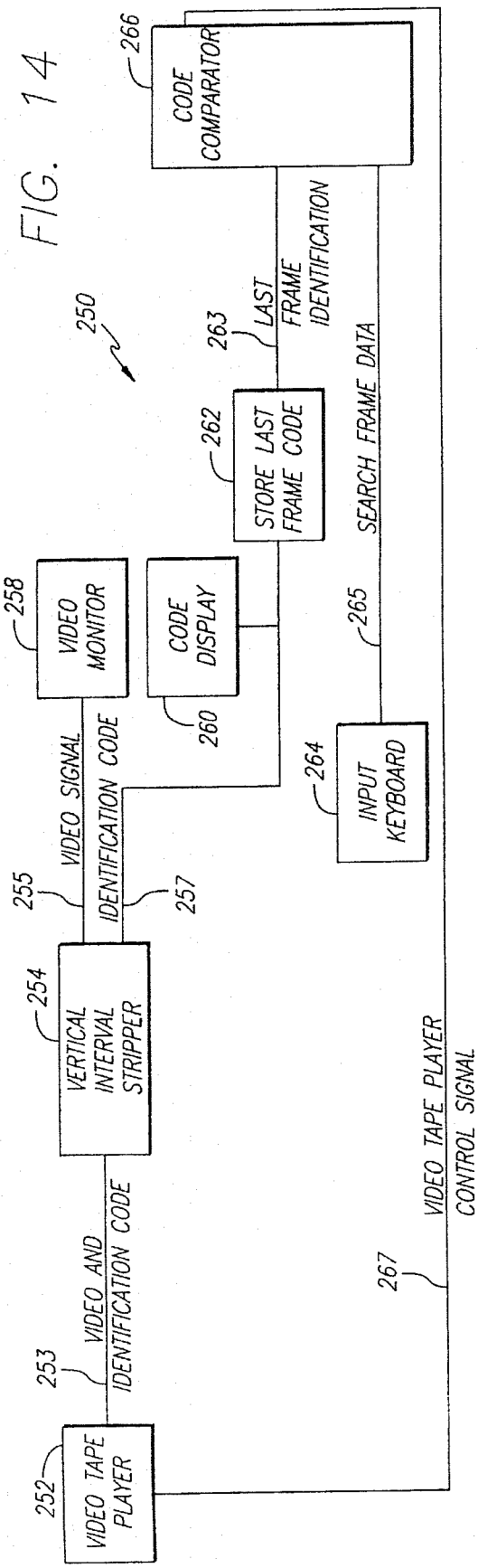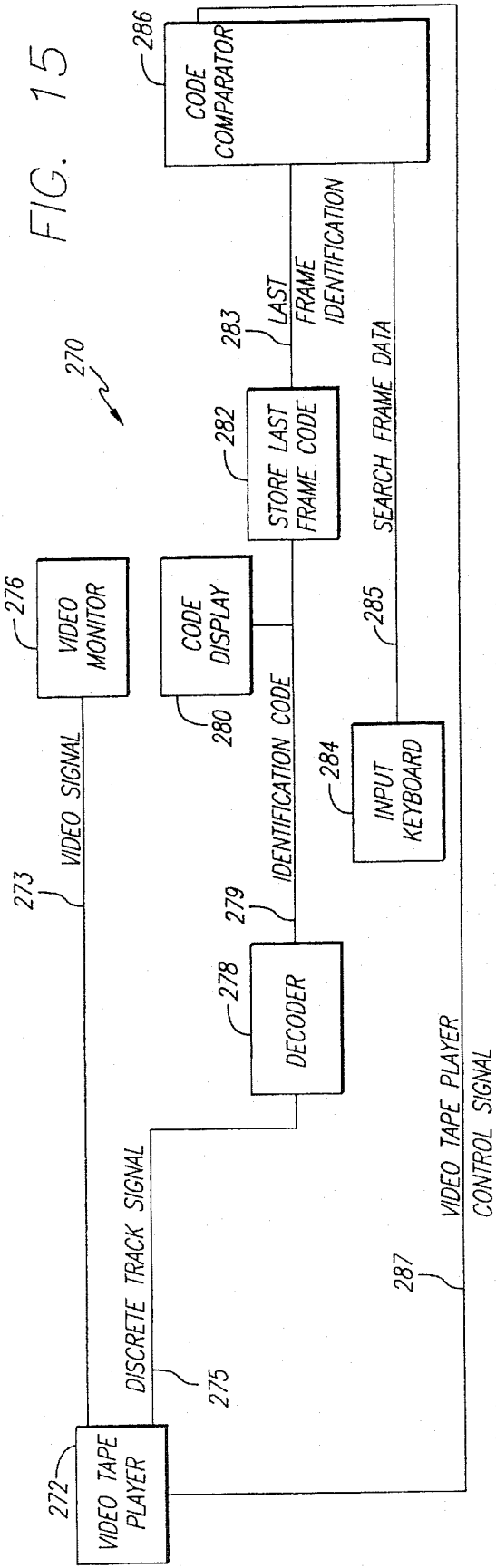

METHOD AND APPARATUS FOR INDEXING AND RETRIEVAL OF A CONTINUOUS VISUAL IMAGE MEDIUM

BACKGROUND OF THE INVENTION

1. Field of the Invention

The present invention relates to the field of data recording and retrieving methods and systems. More particularly, the present invention relates to the field of data recording and retrieving methods and systems used for identifying a visual image medium.

2. Description of the Prior Art

The following eight (8) prior art patents were uncovered in the pertinent field of the present invention.

1. U.S. Pat. No. 4,962,432 issued to Ohtsuka et al. on Oct. 9, 1990 for "Selective Retrieval Of Data From Microfilm Images of Different Forms By Reading A Memory Index Form Cord (Bar Code) Recorded On Each Image Frame" (hereafter "the Ohtsuka Patent").

2. U.S. Pat. No. 4,972,068 issued to Ohtani et al. on Nov. 20, 1990 for "Retrieval Apparatus Readily Adaptable Of Recording Media" (hereafter "the Ohtani Patent").

3. U.S. Pat. No. 4,981,351 issued to Endo on Jan. 1, 1991 for "Film Retrieving Apparatus" (hereafter "the Endo Patent").

4. U.S. Pat. No. 4,987,434 issued to Soshi et al. on Jan. 22, 1991 for "Camera's Data Imprinting Device" (hereafter "the Soshi Patent").

5. U.S. Pat. No. 5,122,645 issued to Saeki et al. on Jun. 16, 1992 for "Method And Apparatus For Reading Bar Code On Photographic Film And Determining Setting Conditions Of Photographic Film" (hereafter "the Saeki Patent").

6. U.S. Pat. No. 5,164,574 issued to Ujiie et al. on Nov. 17, 1992 for "Apparatus For Reading Bar Codes Recorded On Photographic Film" (hereafter "the Ujiie Patent").

7. U.S. Pat. No. 5,164,865 issued to Shaw on Nov. 17, 1992 for "System And Method For Locating Information On A Continuous Image Medium" (hereafter "the Shaw Patent").

8. U.S. Pat. No. 5,212,367 issued to Takenaka on May 18, 1993 for "Method Of Reading Positional Information On Photographic Film" (hereafter "the Takenaka Patent").

The Ohtsuka Patent discloses a system for recording and reading an image information wherein an image containing a certain form and data is recorded on each frame of a microfilm and a desired datum is selected and read from the microfilm. In each frame of the microfilm, an image of a card is printed. The desired datum designated through the keyboard is transferred to a buffer memory at a predetermined timing so that a datum video signal is generated from a letter generator. A code video signal generator generates a form cord video signal for producing a form cord and check cord video signals for producing check cords.

The Ohtani Patent discloses a retrieval apparatus for automatically retrieving a desired image on a recording medium having an image and information for retrieving the image. A memory card stores control information such as retrieval and copy conditions corresponding to a microfilm. The card stores information associated with an image polarity indicating a positive or negative film, information associated with a density of a mark indicating a transparency or non-transparency of the mark, and information associated with the position of a mark indicating whether the mark is present on the upper or lower side of the microfilm or on both the sides The Endo Patent discloses a film retrieving apparatus for retrieving a desired frame in a film. The entire image recorded in each frame of the film is projected onto a screen by a projection lens through a fixed mirror and a half-mirror disposed at predetermined positions.

The Soshi Patent discloses a data imprinting device for a camera. The data imprinting device includes an object luminance photometric sensor for detecting luminance of an object in the vicinity of a symbolic data imprinting area and a light emitting means including a light source for imprinting symbolic data in a photographic film, the brightness of which light source is controllable. The device further includes control-means for controlling the brightness of the light source in the light emitting means according to the ISO data of the film in addition to the luminance of the object in the vicinity of the symbolic data imprinting area which is detected by the object luminance photometric sensor.

The Saeki Patent discloses a method and apparatus for reading a DX bar code recorded on one side of a photographic film and a frame number bar code on the other side edge of the photographic film. The DX bar codes representative of a film type are printed as a latent image on an edge portion of a negative film (e.g. of 135 type), the DX bar codes being made visible upon development. The frame number bar code is used for searching for a desired frame to obtain additional prints and automatically setting it at the print stage of a printer. Two bar code sensor units are disposed at either side of a photographic film passage. Each of the bar code sensor units has two photosensors disposed perpendicularly to the photographic film feed direction. Each time a photographic film is fed by a constant amount, two signals output from each bar code sensor unit are sampled to read the DX bar code and frame number bar code.

The Ujiie Patent discloses an apparatus for reading bar codes recorded on a photographic film. It includes two bar code sensor units which are disposed at both sides of a photographic film passage. Each of the bar code sensor units has two photosensor arrays, each array having a multiplicity of photosensors disposed in the direction of feeding a photographic film. Each photosensor array is disposed perpendicular to the photographic film feed direction.

The Shaw Patent discloses a system and method for locating information on a continuous image medium. It utilizes an index which contains topics of interest on the medium and a code of indicia, such as a time elapse code identifying a portion of the video tape or disk in which desired information can be obtained. Corresponding time elapse codes are visually presented on the video images.

The Takenaka Patent discloses a method of reading positional information on a photographic film. It includes a pair of positional information detecting sensors provided on a negative carrier to serve as the positional information detecting means. These sensors read bar codes provided on each negative film as the negative film is being fed. When a bar of a bar code has been read by the positional information detecting sensors, corresponding data items are supplied to a controller.

The following four (4) pertinent prior art publications were found in the journal published by the Society of Motion Picture and Television Engineers, Inc. (SMPTE). They were related to the application of charge-coupled-device (CCD) in motion picture and television (TV) industries.

1. L. Thorpe, et al., "New Advances in CCD Imaging", SMPTE Journal, 378 (May 1988) (hereafter "the Thorpe Article").

2. Syd Wiles, et al., "Digital Optical Sound on 35 mm Motion-Picture Film", SMPTE Journal, 899 (November 1990) (hereafter "the Wiles Article").

3. F. L. Stok, "The Accordion Charge-Transfer Mechanism: A New Development of the Frame-Transfer CCD Image Sensor", SMPTE Journal, 167 (March 1991) (hereafter "the Stok Article").

4. James Kutzner, et al., "Measurement and Testing of CCD Sensors and Cameras", SMPTE Journal, 325 (May 1992) (hereafter "the Kutzner Article").

The Thorpe Article disclosed certain development in CCD image technology. It described a new CCD which combined frame-transfer (FT) operation with the interline-transfer (IT) mechanism.

The Wiles Article disclosed a system for recording and playing back digital sound track on 35 mm motion picture film. The technologies and devices utilized in the system include CCD, high-output cathode-ray tube (CRT) code writer, digital error-detection and correction (EDC), light emitting diode (LED) code reader, automatic gain control (AGC), and phase locked loop (PLL), etc.

The Stok Article disclosed an accordion charge-transfer mechanism. It can be utilized to improve the FF CCD image sensor. The application of this technology includes studio cameras.

The Kutzner Article disclosed a method for testing CCD sensors and cameras. The CCD sensors tested included frame-interline-transfer (FIT) CCD sensors.

It can be seen that various methods and systems have been developed for the purpose of identifying the particular frames on an image medium. In addition, a variety of types of identification code, including bar code, have been utilized for such purpose. However, this prior art cannot satisfy many practical needs in today's entertainment and communication industries.

For example, one of the particular problems in motion picture industry is the identification and retrieval of films in production. During film editing, each day's shoot results in printing one to three ten-minute reels viewed by the director. To accomplish this, there are many laborious steps, including: (a) the assistant editor synchronizes the sound track to the work print; (b) edge code numbers are applied in synchronization to the work print and magnetic film sound track at one-foot intervals; (c) the editor selects the director's preferred "takes" from the clerk's imprinting script, then assembles a rough cut comprised of a 35 mm magnetic tape sound track running in synchronization with the work print (the director views these "dailies" on either film or tape); (d) a fine cut is assembled following completion of principal photography; and (e) final cut is made for negative conforming.

During the editing, the assistants and editors spend many hours in logging, filing and retrieving the films. This results in huge film production costs. In addition, the only identification on the edited films in the conventional film editing practice is that the edge numbers are hand applied on the film at one-foot intervals after processing. There are many potential errors which may happen during the conventional editing practice, including: (a) mislabeling of reels on location; (b) mislabeling of film cans; (c) laboratory mislabeling the "dailies"; (d) mismatch of sound track to picture; (e) mismatch edge code numbers to reel; (f) duplication of edge code numbers; (g) film cut between edge numbers; (h) misreading of edge numbers; (i) loss or damage of edge numbers; and (j) mismatch final edit to original negative.

As the above example illustrates, one of the major problems in the visual media industry is the identification of original production data for editing. Other major problems in the visual media industry include the identification and retrieval of content information for education purposes, and identification of original source material for copyright protection.

It is desirable to develop a new data recording and retrieving method and system which can be used to have absolute frame identification codes recorded onto or retrieved from a continuous visual image medium for identifying each frame of the continuous visual image medium, preferably at the same instant while the normal visual image is recorded onto or retrieved from the continuous visual image medium, without interfering with the formation or display of the normal visual image.

SUMMARY OF THE INVENTION

The present invention is a method and system for indexing and retrieval of a continuous visual image medium.

The present invention is a method of applying variable, momentous production information to each frame of a continuous visual image medium at the instant of use or after use, without interfering with the formation or display of the normal visual image on the same frame. The recorded production information become absolute reference points on the continuous visual image medium, enabling fast and accurate identification and retrieval at a later date. The method addresses various needs in an ever increasing market ranging from major motion pictures to home videos markets.

The present invention is also a system of recording or retrieving the production information on each frame of a continuous visual image medium. The system includes the actual hardware for the writing and reading of the index code, and the software necessary to decode the code and translate it into useful and user readable information. The system offers producers, directors and editors the freedom to quickly identify and retrieve footage for consideration, while maintaining an accurate asset control on a frame by frame basis. The system also maximizes the usefulness and potential re-use of visual materials.

The primary objectives of the present invention include: (a) providing identification of original production data for motion picture editing and program production control; (b) providing identification of content information for film, video and slide library cataloging; (c) providing identification and retrieval of content information for educational and instructional purposes; and (d) providing identification of original source material for copyright and anti-piracy protection.

The additional objectives of the present invention include: (a) increasing efficiency of the entire post production operation of motion picture films or video tapes; (b) producing major reductions in post production time; (c) rendering cost savings in editing (both in time and personnel); (d) providing efficient archiving and retrieval of stock footage as an additional revenue source; (e) co-existing and compatible with SMPTE or other standard or conventional codes with additional specific production data; (f) providing simultaneous indexing during production, with the director's preferred tasks marked; (g) producing a reliable shot list to the editor for assembly of the "dailies"; (h) replacing and eliminating the edge code numbers; (i) offering a common index code for dubbing film to video or back; (j) preventing misfiled film reels or cans; (k) making it possible to have frame-accurate editing when editing magnetic tape to film; (l) making negative cutting more simple and accurate; and (m) rendering precise transferring of identification code to any medium without logging or inscribing.

Described generally, the present invention is a method of indexing a continuous visual image medium that is produced at a certain frame rate and contains a series of frames each encompassing an area for visual image. First, an index rate is generated which is consistent with the frame rate, and a user inputs identification information for each frame of the continuous visual image medium. Then the identification information is encoded into an index code at the index rate. While the continuous visual image medium is continued at the frame rate, recording the index code to the continuous visual image medium at respective locations adjacent to but outside of the visual image area of each frame of the continuous visual image medium. Therefore, the index code can be retrieved at a later time for identifying each frame of the continuous visual image medium, but when the continuous visual image medium is played back to show the visual image on a display screen, the index code will remain invisible and not be shown on the display screen.

The present invention method may further include the steps of playing back the continuous visual image medium and continuously retrieving the index code of each frame of the continuous visual image medium. A user can input a search code of a desired frame on the continuous visual image medium, and the input search code and the retrieved index code is compared until they match to retrieve the desired frame on the continuous visual image medium.

The present invention also includes an apparatus for indexing a continuous visual image medium that is produced at a certain frame rate and contains a series of frames each encompassing an area for visual image. The indexing apparatus basically includes a clock generator for generating an index rate which is consistent with the frame rate, a keyboard for inputing identification information for each frame of the continuous visual image medium, an encoder for encoding the identification information into an index code at the index rate, and a code writer for recording the index code to the continuous visual image medium at respective locations adjacent to but outside of the visual image area of each frame of the continuous visual image medium while the continuous visual image medium is continued at the frame rate. Accordingly, the index code can be retrieved at a later time for identifying each frame of the continuous visual image medium, but when the continuous visual image medium is played back to show the visual image on a display screen, the index code will remain invisible and not be shown on the display screen.

The present invention further includes an apparatus for retrieving an index code for each frame of a continuous visual image medium. The retrieval apparatus basically includes a visual image reproducer for playing back the continuous visual image medium, a code reader continuously retrieving the index code of each frame of the continuous visual image medium, a keyboard for inputing a search code of a desired frame on the continuous visual image medium, and a code comparator for comparing the input search code and the retrieved index code until they match. The retrieval apparatus also includes a device for controlling the visual image reproducer to retrieve the desired frame on the continuous visual image medium upon a matching of the input search code and the retrieved index code.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is an illustrative diagram of the representative composition of the present invention continuous image medium index code.

FIG. 2 is an illustrative diagram showing the application of the present invention index code on motion picture films.

FIG. 3 is an illustrative diagram showing the application of the present invention index code on video tapes.

FIG. 4 is an illustrative diagram showing the application of the present invention index code on slides.

FIG. 10 is a block diagram showing the video tape vertical interval encoding scheme of the present invention.

FIG. 11 is a block diagram showing the video tape discrete track encoding scheme of the present invention.

FIG. 12 is a block diagram showing the general retrieving scheme of the present invention.

FIG. 13 is a block diagram showing the motion picture film retrieving scheme of the present invention.

FIG. 14 is a block diagram showing the video tape vertical interval retrieving scheme of the present invention.

FIG. 15 is a block diagram showing the video tape discrete track retrieving scheme of the present invention.

DESCRIPTION OF THE PREFERRED EMBODIMENT

Figure 5:
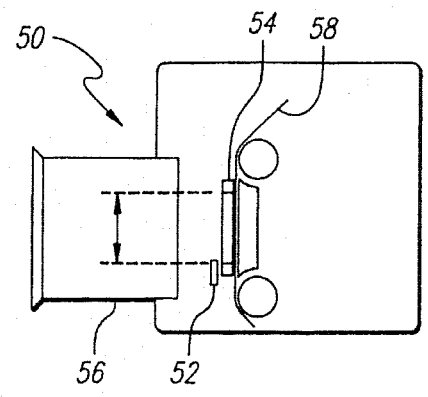
FIG. 5 is an illustrative side view diagram of a motion picture camera incorporated with a code writer for writing the present invention index code onto a motion picture film.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a new data recording and retrieving method and system which can be used to have absolute frame identification codes recorded onto or retrieved from a continuous visual image medium for identifying each frame of the continuous visual image medium, preferably at the same instant while the normal visual image is recorded onto or retrieved from the continuous visual image medium, without interfering with the formation or display of the normal visual image.

The present invention is a method of indexing a continuous visual image medium that is produced at a certain frame rate and contains a series of frames each encompassing an area for visual image. The present invention method basically includes the steps of generating an index rate which is consistent with the frame rate, inputing identification information for each frame of the continuous visual image medium, encoding the identification information into an index code at the index rate, and recording the index code to the continuous visual image medium at respective locations adjacent to but outside of the visual image area of each frame of the continuous visual image medium while the continuous visual image medium is continued at the frame rate. The index code can be retrieved at a later time for identifying each frame of the continuous visual image medium, but when the continuous visual image medium is played back to show the visual image on a display screen, the index code will remain invisible and not be shown on the display screen.

The present invention method of retrieving the index code recorded on a continuous image medium basically includes the steps of playing back the continuous visual image medium, continuously retrieving the index code of each frame of the continuous visual image medium, inputing a search code of a desired frame on the continuous visual image medium, and comparing the input search code and the retrieved index code until they match to retrieve the desired frame on the continuous visual image medium.

Referring to FIG. 1, there is shown an illustrative diagram of the representative composition of the present invention continuous image medium index code 10. The code 10 is a binary data bit serial code typically containing 300 bits of information, indiscernible to the naked eye. The basis of the index code 10 is chosen by the author and correlated to printed original documents, for indexing the frames of the image medium. The index code 10 may be any combination of symbols, characters or numbers as desired. It may contain product information, such as production title, camera I.D., roll or reel number or type number, scene number, take number, frame number, date of filming, and other user data. The index code 10 may take the form of bar code, which is denoted by numeral 12 in the subsequent figures.

A primary application of the present invention is motion picture films. Referring to FIG. 2, there is shown an illustrative diagram showing the application of the present invention index code on a motion picture film 20. The motion picture film 20 contains a series of frames 22. Each frame 22 contains a normal visual image 24 within a "safe" imprinting area 26, as indicated by the dotted lines. Along the opposite edges of the film 20 there are film gate sprocket holes 28. The bar code 12 is imprinted on each frame 22 but outside of the safe shooting area 24, so that when the film 20 is projected, the image 24 can be viewed without the interference of bar code 12.

Another important application of the present invention is video tapes. Referring to FIG. 3, there is shown an illustrative diagram showing the application of the present invention index code on a video tape 30. The video tape 30 also has a series of flames 32 which contains video signals for normal image 34. There are two ways to record the index code 10. The index code 10 can be recorded in the vertical interval areas 36 which are between the frames 32, or recorded on one of the unused discrete data track areas 38 of the video tape 30. In either way, when the video tape 30 is played back and viewed on a TV screen, the index code 10 will not appear on the TV screen. It is understood that the depiction of the index codes in FIG. 3 is only drawn out for the purpose of illustration of the location of the index codes, which are actually not visible on the video tape.

The present invention can also be utilized in many other applications. For example, referring to FIG. 4, there is shown an illustrative diagram showing the application of the present invention index code on a slide 40. The slide 40 has a frame which contains a visual image 44. The visual image 44 is imprinted within a picture area 46. The bar code 12 is imprinted on the frame 42 but outside the picture area, so that when the slide 40 is projected, the bar code 12 will not be seen.

The present invention is also an apparatus for indexing a continuous visual image medium that is produced at a certain frame rate and contains a series of flames each encompassing an area for visual image. The present invention apparatus basically includes a clock generator for generating an index rate which is consistent with the frame rate, an information inputing device for inputing identification information for each frame of the continuous visual image medium, an electronic encoder for encoding the identification information into an index code at the index rate, and a code writer for recording the index code to the continuous visual image medium at respective locations adjacent to but outside of the visual image area of each frame of the continuous visual image medium while the continuous visual image medium is continued at the frame rate. The index code can be retrieved at a later time for identifying each frame of the continuous visual image medium, but when the continuous visual image medium is played back to show the visual image on a display screen, the index code will remain invisible and not be shown on the display screen.

The present invention index code recording and retrieving system can be integrated with existing photographic or video equipment, such as motion picture cameras, projectors, video tape recorders (VTR), etc. For example, referring to FIG. 5, there is shown an illustrative side view diagram of a motion picture index camera 50 incorporated with a bar code writer 52 for writing the present invention index code 10 onto a motion picture film 58. The bar code writer 52 can utilize a light-emitting diode (LED) or a high-output cathode-ray tube (CRT). It can be mounted on the film gate 54 of the camera 50, between the lens 56 of the camera 50 and the film 58.

Figure 6:
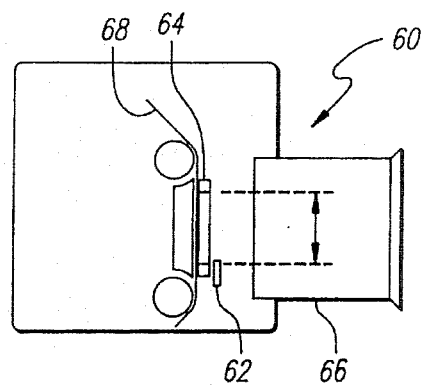
FIG. 6 is an illustrative side view diagram of a motion picture projector incorporated with a code reader for reading the present invention index code imprinted on a motion picture film.
Figure 7:
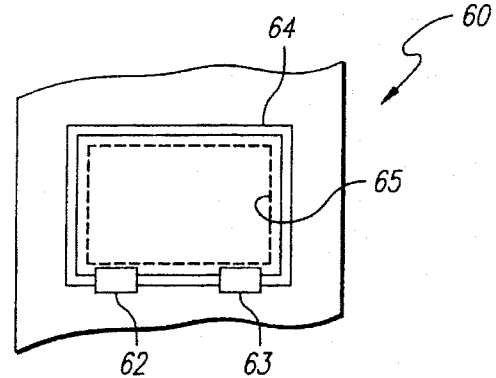
FIG. 7 is an illustrative front view diagram of the camera gate inside a motion picture camera, showing the location of the code reader and frame reader.

Referring to FIGS. 6 and 7, there are shown illustrative diagrams of a motion picture index projector or editor 60 incorporated with a code reader 62 for reading the present invention index code 10 imprinted on a motion picture film 68. The code reader 62 can utilize a charge-coupled device (CCD) which is triggered by a frame reader 63 which counts and detects the frames of the motion picture film 68. The code reader 62 and frame reader 63 can be mounted side by side on the film gate 64 of the projector or editor 60, adjacent to but below the safe shooting area 65, between the lens 66 of the projector 60 and the film 68.

Figure 8:
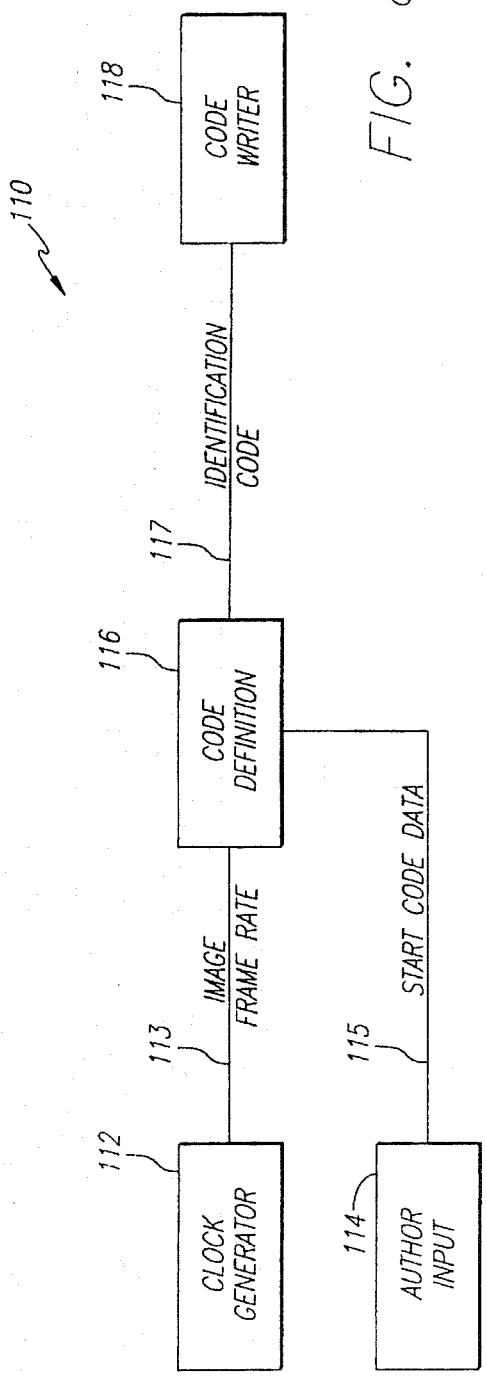
FIG. 8 is a block diagram showing the general encoding scheme of the present invention.

The encoding schemes of the present invention are illustrated in FIGS. 8 through 11. Referring to FIG. 8, there is shown at 110 a block diagram showing the general encoding scheme of the present invention. First, a clock generator type device 112 is utilized for generating an index rate 113 which is consistent with the rate of the frame. An author can then use a keyboard 114 to input identification information 115 for each frame of the continuous visual image medium. The identification information is encoded by an encoder 116 into an index code 117 at the index rate. In fact, the author can input only the identification code of a start frame, and let the encoder 116 automatically encode identification code for the subsequent flames. Finally, the index code 117 is recorded by a code writer 118 onto the continuous visual image medium at respective locations adjacent to but outside of the visual image area of each frame of the continuous visual image medium while the continuous visual image medium is continued at the frame rate.

Figure 9:
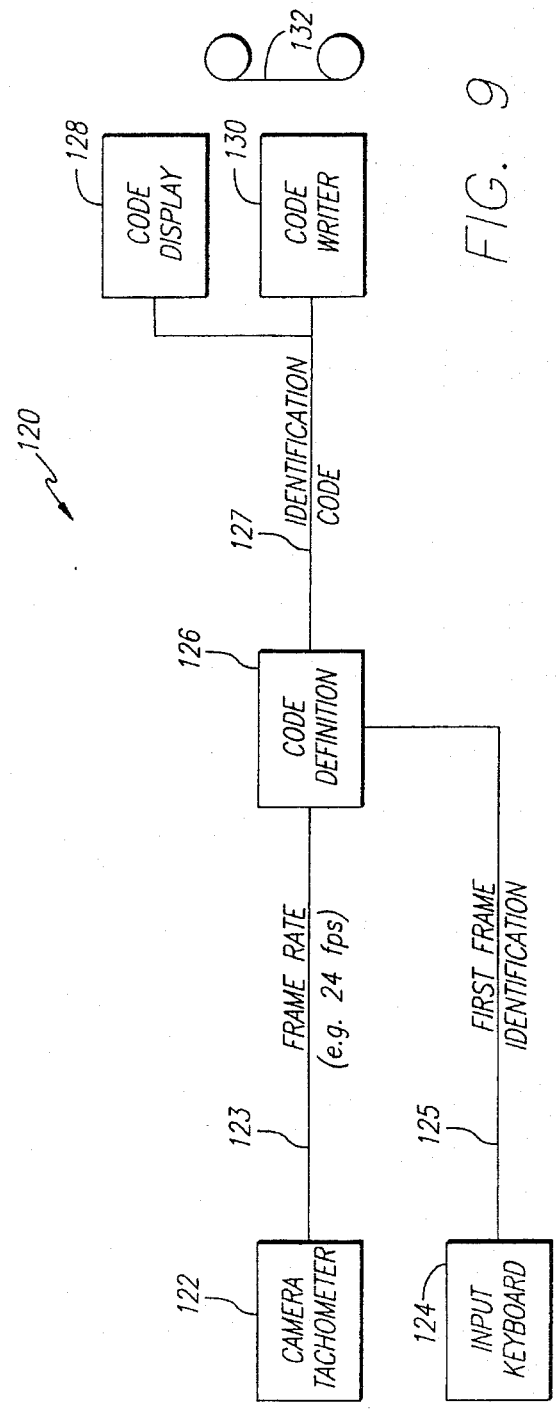
FIG. 9 is a block diagram showing the motion picture film encoding scheme of the present invention.

Referring to FIG. 9, there is shown at 120 a block diagram showing the motion picture film encoding scheme of the present invention. The motion picture index recorder can be integrated with a motion picture camera and uses the camera tachometer 122 to generate an index rate 123 which is consistent with the frame rate, which is typically twenty-four flames per second (24 fps). The clerk can use a remote keyboard 124 to input identification information 125 for each frame of the motion picture film 132 (or just the index for the first frame). The identification information is encoded by an encoder 126 into index code 127 at the index rate, which can be monitored on a code display 128. The index code is then shot onto the film 132 by a code writer 130. Preferably the recording of the index code is performed at the instant of imprinting the motion picture film, but it certainly can also be performed at an editing or maintenance stage.

Referring to FIG. 10, there is shown at 140 a block diagram showing the video tape vertical interval encoding scheme of the present invention. Video signal 143 is input from a video signal source 142 such as a video tape player or a video camera. A vertical sync stripper 144 is used to stripe the vertical sync intervals 145 on the video tape. The user can use a keypad 146 either on the video tape recorder (VTR) or on the remote control to input identification information 147 for each frame or the first frame of the video tape. The identification information 147 is encoded by an encoder 148 into an index code 149, which can be monitored on a code display 150, and inserted by a vertical interval inserter 152 into the vertical sync intervals. The combined signal 153 containing index code 149 inserted in the vertical sync intervals are then recorded by the VTR 154.

Referring to FIG. 11, there is shown at 160 a block diagram showing the video tape discrete track encoding scheme of the present invention. Again, video signal 163 is input from a video signal source 162 such as a video tape player or a video camera. A data track decoder 164 is utilized for selecting an unused discrete data track 165 on the video tape. The user can use a keypad 166 to input identification information 167 for each frame of the video tape. An encoder 168 then encodes the identification information into an index code 169, which can be monitored by a code display 170. The index code signal 171 is finally recorded by a VTR 174 onto the unused discrete data track 165 of the video tape at respective locations adjacent to each frame, while the normal video signal 173 is record to the image frames of the video tape.

The retrieving schemes of the present invention are illustrated in FIGS. 12 through 15. Referring to FIG. 12, there is shown at 210 a block diagram showing the general retrieval scheme of the present invention. First, the continuous visual image medium is played back by a visual image reproducer 212. Then the index code 213 of each frame as recorded on the continuous visual image medium is continuously retrieved by a code reader 214. The index code of each frame, or that of the last frame, is stored by a memory device 216. An editor or user can input a search code 219 of a desired frame on the continuous visual image medium on a keyboard 218, and a code comparator 220 is used to compare the input search code 219 and the stored index code 217 until they match. When there is a matching, a control signal 221 is sent to the visual image reproducer 212 so it can stop at the desired frame.

Referring to FIG. 13, there is shown at 230 a block diagram showing the motion picture film retrieving scheme of the present invention. The index code on a motion picture film 232 is read by a code reader 234 integrated in a motion picture projector, and monitored on a code display 236. The retrieved index code 237 of each frame or the last frame is stored in a memory device 238. An assistant or editor can input on a remote keyboard 240 a search code 241 of a desired frame on the motion picture film. A code comparator compares the input search code 241 and the store index code 239 until they match, and sends a control signal 243 to the projector for retrieval of that desired frame.

Referring to FIG. 14, there is shown at 250 a block diagram showing the video tape vertical interval retrieving scheme of the present invention. A video tape is played back by a video tape player 252. The video signal 253 is sent to a vertical interval decoder 254 which is utilized to continuously decode the index code 257 of each frame from the vertical sync intervals on the video tape, as separated from the video image signal 255 which can be viewed on a TV screen 258. The index code may be monitored on a separate code display 260. The index code of each frame or the last frame is stored in a memory device 262. A user can use a keypad 264 to input a search code 265 of a desired frame on the video tape. A code comparator 266 will then compare the input search code 265 with the stored index code 263 until they match. When there is a matching, a control signal 267 will be sent to the video tape player to stop at that desired frame.

Referring to FIG. 15, there is shown at 270 a block diagram showing the video tape discrete data track retrieving scheme of the present invention. Again, a video tape is played back by a video tape player 272. The video image signal 273 can be viewed on a TV screen 276, while the index code 275 which is recorded on a discrete data track is sent to a decoder 278, which continuously decodes the index code of each frame from the discrete data track on the video tape. The decoded index code 279 may be monitored on a separate code display 280. The index code of each frame or the last frame is stored in a memory device 282. A user can use a keypad 284 to input a search code 285 of a desired frame on the video tape. A code comparator 286 will then compare the input search code 285 with the stored index code 283 until they match. When a matching occurs, a control signal 287 will be sent to the video tape player to stop at that desired frame.

Figure 16:
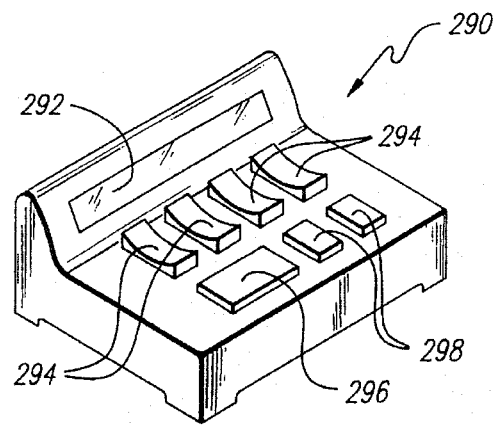
FIG. 16 is a perspective view of the remote keyboard of the present invention continuous image medium identification system.

A remote keyboard 290 which can be utilized in the present invention is shown in FIG. 16. The keyboard 290 may incorporate a display screen 292, several numerical keys 294, an enter key 296, and several function keys 298, such as "GOTO" for jumping to a particular code and "CLEAR" for clearing the screen, etc.

Figure 17:
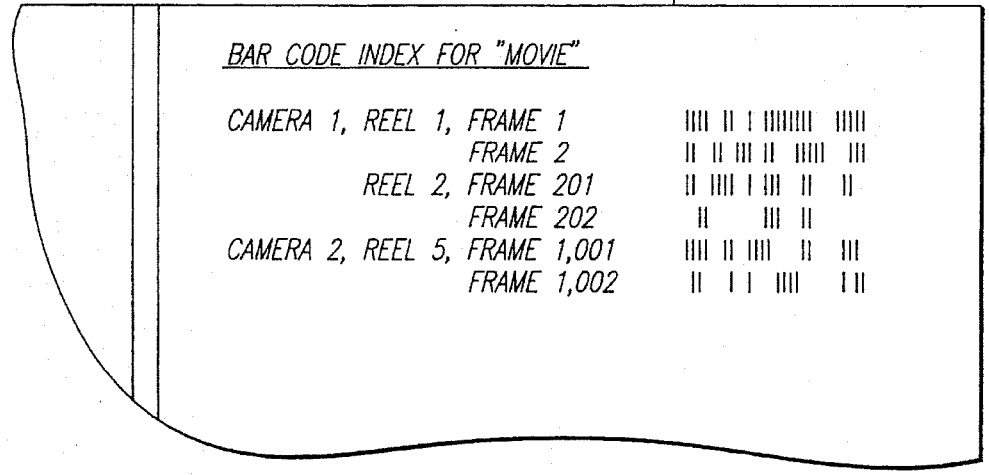
FIG. 17 is an illustrative diagram of the hard-copy index of the present invention continuous image medium identification system.

The present invention system may be used in conjunction with a hard-copy index 300, as shown in FIG. 17. Once all of the frames of the continuous visual image medium are indexed, the hard-copy index 300 can be generated to maintain a permanent record of the index codes. The hard-copy index 300 may include the identification information and correlated index code which may be in the form of bar codes. The hard-copy index 300 can be used as a quick reference when a desired frame needs to be retrieved. For example, an editor can simply scan the bar code of the desired frame. The scanner can be connected to the input device, and the desired frame can be quickly retrieved by the retrieval system of the present invention.

The present invention has many advantageous features, including: (a) it increases efficiency of the entire post production operation of motion picture films or video tapes; (b) it offers major reductions in post production time; (c) it yields cost savings in editing (both in time and personnel); (d) it provides efficient archiving and retrieval of stock footage as an additional revenue source; (e) it can be run in parallel to SMPTE or other standard or conventional codes with additional specific production data; (f) the present invention index codes can be printed out during production, with the director's preferred tasks marked; (g) it provides a reliable shot list to the editor for assembly of the "dailies"; (h) it can replace the edge code numbers; (i) it offers a common index code for dubbing film to video or back; (j) it prevents misfiled film reels or cans; (k) it makes it possible to have flame-accurate editing when editing magnetic tape to film; (l) it makes negative cutting more simple and accurate; and (m) the present invention code can be precisely transferred to any medium without logging or inscribing.

Defined in detail, the present invention is a method of indexing a motion picture film that is produced at a certain frame rate and contains a series of flames each having a periphery area surrounding a safe shooting area, comprising the steps of: (a) generating an index rate which is consistent with the frame rate; (b) inputing identification information for each frame of the motion picture film; (c) encoding the identification information into an index code at the index rate; and (d) while the motion picture is continued at the frame rate, imprinting the index code on the motion picture film at the periphery area of each frame of the motion picture film, such that the index code can be retrieved at a later time for identifying each frame of the motion picture film, but when the motion picture film is projected to a movie screen, the index code will remain invisible and not be shown on the movie screen.

Defined also in detail, the present invention is a method of indexing a video tape that contains a series of flames of visual images, where the flames are separated by respective vertical sync intervals, the method comprising the steps of: (a) stripping the vertical sync intervals on the video tape; (b) inputing identification information for each frame of the video tape; (c) encoding the identification information into an index code; (d) inserting the index code to the vertical sync intervals respectively; and (e) while the video tape is continued, recording the index code inserted in the vertical sync intervals to the video tape respectively between the flames, such that the index code can be retrieved at a later time for identifying each frame of the video tape, but when the video tape is played back to show the visual image on a television screen, the index code will remain invisible and not be shown on the television screen.

Defined again in detail, the present invention is a method of indexing a video tape that contains a series of frames of visual images and at least one unused data track along the frames, the method comprising the steps of: (a) selecting the at least one unused data track on the video tape; (b) inputing identification information for each frame of the video tape; (c) encoding the identification information into an index code; and (d) while the video tape is continued, recording the index code to the at least one unused data track of the video tape at respective locations adjacent to each frame, such that the index code can be retrieved at a later time for identifying each frame of the video tape, but when the video tape is played back to show the visual image on a television screen, the index code will remain invisible and not be shown on the television screen.

Defined broadly, the present invention is a method of indexing a continuous visual image medium that is produced at a certain frame rate and contains a series of frames each encompassing an area for visual image, comprising the steps of: (a) generating an index rate which is consistent with the frame rate; (b) inputing identification information for each frame of the continuous visual image medium; (c) encoding the identification information into an index code at the index rate; and (d) while the continuous visual image medium is continued at the frame rate, recording the index code to the continuous visual image medium at respective locations adjacent to but outside of the visual image area of each frame of the continuous visual image medium, such that the index code can be retrieved at a later time for identifying each frame of the continuous visual image medium, but when the continuous visual image medium is played back to show the visual image on a display screen, the index code will remain invisible and not be shown on the display screen.

The present invention method as broadly defined further comprises the steps of: (a) playing back the continuous visual image medium; (b) continuously retrieving the index code of each frame of the continuous visual image medium; (c) inputing a search code of a desired frame on the continuous visual image medium; and (d) comparing the input search code and the retrieved index code until they match to retrieve the desired frame on the continuous visual image medium.

Defined alternatively in detail, the present invention is a motion picture index recorder integrated with a motion picture camera which has a gate, for indexing a motion picture film that is produced at a certain frame rate and contains a series of flames each having a periphery area surrounding a safe shooting area, comprising: (a) a camera tachometer for generating an index rate which is consistent with the frame rate; (b) a keyboard for inputing identification information for each frame of the motion picture film; (c) an encoder for encoding the identification information into an index code at the index rate; and (d) a code writer mounted on the gate of the motion picture camera for imprinting the index code on the motion picture film at the periphery area of each frame of the motion picture film while the motion picture is continued at the frame rate, such that the index code can be retrieved at a later time for identifying each frame of the motion picture film, but when the motion picture film is projected to a movie screen, the index code will remain invisible and not be shown on the movie screen.

Defined additionally in detail, the present invention is a motion picture index retriever for retrieving index code imprinted on each frame of a motion picture film, comprising: (a) a motion picture projector for projecting the motion picture film; (b) a frame reader mounted on a gate of the motion picture projector for detecting each frame of the motion picture film to trigger a code reader also mounted on the gate of the motion picture projector for retrieving the index code of each frame of the motion picture film; (c) a keyboard for inputing a search code of a desired frame on the motion picture film; (d) a code comparator for comparing the input search code and the retrieved index code until they match; and (e) means for controlling the motion picture projector to retrieve the desired frame on the motion picture film upon a matching of the input search code and the retrieved index code.

Defined also alternatively in detail, the present invention is a video tape index recorder for indexing a video tape that contains a series of frames of visual images, where the flames are separated by respective vertical sync intervals, comprising: (a) a vertical sync stripper for stripping the vertical sync intervals on the video tape; (b) a keypad for inputing identification information for each frame of the video tape; (c) an encoder for encoding the identification information into an index code; (d) a vertical interval inserter for inserting the index code to the vertical sync intervals respectively; and (e) a video tape recorder for recording the index code inserted in the vertical sync intervals to the video tape respectively between the flames while the video tape is continued, such that the index code can be retrieved at a later time for identifying each frame of the video tape, but when the video tape is played back to show the visual image on a television screen, the index code will remain invisible and not be shown on the television screen.

Defined also additionally in detail, the present invention is a video tape index player for retrieving index code recorded for each frame of a video tape, comprising: (a) a video tape player for playing back the video tape; (b) a vertical interval decoder for continuously decoding the index code of each frame from the vertical sync intervals on the video tape; (c) a keypad for inputing a search code of a desired frame on the video tape; (d) a code comparator for comparing the input search code and the retrieved index code until they match; and (e) means for controlling the video tape player to retrieve the desired frame on the video tape upon a matching of the input search code and the retrieved index code.

Defined again alternatively in detail, the present invention is a video tape index recorder for indexing a video tape that contains a series of flames of visual images and at least one unused data track along the flames, comprising: (a) a data track decoder for selecting the at least one unused data track on the video tape; (b) a keypad for inputing identification information for each frame of the video tape; (c) an encoder for encoding the identification information into an index code; and (d) a video tape recorder for recording the index code to the at least one unused data track of the video tape at respective locations adjacent to each frame while the video tape is continued, such that the index code can be retrieved at a later time for identifying each frame of the video tape, but when the video tape is played back to show the visual image on a television screen, the index code will remain invisible and not be shown on the television screen.

Defined again additionally in detail, the present invention is a video tape index player for retrieving index code recorded on at least one data track of a video tape for each frame of the video tape, comprising: (a) a video tape player for playing back the video tape; (b) a data track decoder for continuously decoding the index code of each frame from the at least one data track of the video tape; (c) a keypad for inputing a search code of a desired frame on the video tape; (d) a code comparator for comparing the input search code and the retrieved index code until they match; and (e) means for controlling the video tape player to retrieve the desired frame on the video tape upon a matching of the input search code and the retrieved index code.

Alternatively defined broadly, the present invention is an apparatus for indexing a continuous visual image medium that is produced at a certain frame rate and contains a series of flames each encompassing an area for visual image, comprising: (a) a clock generator for generating an index rate which is consistent with the frame rate; (b) a keyboard for inputing identification information for each frame of the continuous visual image medium; (c) an encoder for encoding the identification information into an index code at the index rate; and (d) a code writer for recording the index code to the continuous visual image medium at respective locations adjacent to but outside of the visual image area of each frame of the continuous visual image medium while the continuous visual image medium is continued at the frame rate, such that the index code can be retrieved at a later time for identifying each frame of the continuous visual image medium, but when the continuous visual image medium is played back to show the visual image on a display screen, the index code will remain invisible and not be shown on the display screen.

Additionally defined broadly, the present invention is an apparatus for retrieving an index code for each frame of a continuous visual image medium, comprising: (a) a visual image reproducer for playing back the continuous visual image medium; (b) a code reader continuously retrieving the index code of each frame of the continuous visual image medium; (c) a keyboard for inputing a search code of a desired frame on the continuous visual image medium; (d) a code comparator for comparing the input search code and the retrieved index code until they match; and (e) means for controlling the visual image reproducer to retrieve the desired frame on the continuous visual image medium upon a matching of the input search code and the retrieved index code.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A method of indexing a motion picture film that is produced at a certain frame rate and contains a series of frames each having a periphery area surrounding a safe shooting area, comprising the steps of:

a. generating an index rate which is consistent with said frame rate;

b. inputing identification information for each frame of said motion picture film;

c. encoding said identification information into an index code at said index rate; and d. while said motion picture is continued at said frame rate, imprinting said index code on said motion picture film at said periphery area of each frame of said motion picture film, such that said index code can be retrieved at a later time for identifying each frame of said motion picture film, but when said motion picture film is projected to a movie screen, said index code will remain invisible and not be shown on the movie screen.

2. The method as defined in claim 1 further comprising the step of monitoring said index code.

3. The method as defined in claim 1 further comprising the steps of:

a. projecting said motion picture film;

b. detecting each frame of said motion picture film to trigger a code reader to read said index code of each frame of said motion picture film;

c. inputing a search code of a desired frame on said motion picture film; and d. comparing said input search code and said retrieved index code until they match to retrieve said desired frame on said motion picture film.

4. The method as defined in claim 3 further comprising the step of monitoring said index code retrieved from said motion picture film.

5. A method of indexing a continuous visual image medium that is produced at a certain frame rate and contains a series of frames each encompassing an area for visual image, comprising the steps of:

a. generating an index rate which is consistent with said frame rate;

b. inputing identification information for each frame of said continuous visual image medium;

c. encoding said identification information into an index code at said index rate; and d. while said continuous visual image medium is continued at said frame rate, recording said index code to said continuous visual image medium at respective locations adjacent to but outside of said visual image area of each frame of said continuous visual image medium, such that said index code can be retrieved at a later time for identifying each frame of said continuous visual image medium, but when said continuous visual image medium is played back to show the visual image on a display screen, said index code will remain invisible and not be shown on the display screen.

6. The method as defined in claim 5 further comprising the steps of:

a. playing back said continuous visual image medium;

b. continuously retrieving said index code of each frame of said continuous visual image medium;

c. inputing a search code of a desired frame on said continuous visual image medium; and d. comparing said input search code and said retrieved index code until they match to retrieve said desired frame on said continuous visual image medium.

7. The method as defined in claim 6 further comprising the step of monitoring said index code retrieved from said continuous visual image medium.

8. A motion picture index recorder integrated with a motion picture camera which has a gate, for indexing a motion picture film that is produced at a certain frame rate and contains a series of frames each having a periphery area surrounding a safe shooting area, comprising: p1 a. a camera tachometer for generating an index rate which is consistent with said frame rate;

b. a keyboard for inputing identification information for each frame of said motion picture film;

c. an encoder for encoding said identification information into an index code at said index rate; and d. a code writer mounted on said gate of said motion picture camera for imprinting said index code on said motion picture film at said periphery area of each frame of said motion picture film while said motion picture is continued at said frame rate, such that said index code can be retrieved at a later time for identifying each frame of said motion picture film, but when said motion picture film is projected to a movie screen, said index code will remain invisible and not be shown on the movie screen.

9. The motion picture index recorder as defined in claim 8 further comprising a monitor for monitoring said index code.

10. A motion picture index retriever for retrieving index code imprinted on each frame of a motion picture film, comprising:

a. a motion picture projector for projecting said motion picture film;

b. a frame reader mounted on a gate of said motion picture projector for detecting each frame of said motion picture film to trigger a code reader also mounted on the gate of said motion picture projector for retrieving said index code of each frame of said motion picture film;

c. a keyboard for inputing a search code of a desired frame on said motion picture film;

d. a code comparator for comparing said input search code and said retrieved index code until they match;

e. a monitor for monitoring said index code retrieved from said motion picture film; and f. means for controlling said motion picture projector to retrieve said desired frame on said motion picture film upon a matching of said input search code and said retrieved index code.

11. An apparatus for indexing a continuous visual image medium that is produced at a certain frame rate and contains a series of frames each encompassing an area for visual image, comprising:

a. a clock generator for generating an index rate which is consistent with said frame rate;

b. a keyboard for inputing identification information for each frame of said continuous visual image medium;

c. an encoder for encoding said identification information into an index code at said index rate; and d. a code writer for recording said index code to said continuous visual image medium at respective locations adjacent to but outside of said visual image area of each frame of said continuous visual image medium while said continuous visual image medium is continued at said frame rate, such that said index code can be retrieved at a later time for identifying each frame of said continuous visual image medium, but when said continuous visual image medium is played back to show the visual image on a display screen, said index code will remain invisible and not be shown on the display screen.

12. An apparatus for retrieving an index code for each frame of a continuous visual image medium, comprising:

a. a visual image reproducer for playing back said continuous visual image medium;

b. a code reader continuously retrieving said index code of each frame of said continuous visual image medium;

c. a keyboard for inputing a search code of a desired frame on said continuous visual image medium;

d. a code comparator for comparing said input search code and said retrieved index code until they match;

e. a monitor for monitoring said index code retrieved from said continuous visual image medium; and f. means for controlling said visual image reproducer to retrieve said desired frame on said continuous visual image medium upon a matching of said input search code and said retrieved index code.

* * * * *